United States Patent
Zhou et al.

(10) Patent No.: US 8,358,481 B2
(45) Date of Patent: Jan. 22, 2013

(54) NANO-LITHOGRAPHY WITH ROTATING TARGET AND SERVO-POSITIONED TIP

(75) Inventors: Yuchen Zhou, San Jose, CA (US);
Erhard Schreck, San Jose, CA (US);
David Hu, Los Altos, CA (US)

(73) Assignee: Headway Technologies, Inc., Milpitas, CA (US)

( * ) Notice: Subject to any disclaimer, the term of this patent is extended or adjusted under 35 U.S.C. 154(b) by 1330 days.

(21) Appl. No.: 12/080,278

(22) Filed: Apr. 2, 2008

(65) Prior Publication Data
US 2010/0321820 A1    Dec. 23, 2010

(51) Int. Cl.
*G11B 11/08*    (2006.01)

(52) U.S. Cl. ............. 360/55; 360/69; 360/135; 369/126

(58) Field of Classification Search .................. None
See application file for complete search history.

(56) References Cited

U.S. PATENT DOCUMENTS

| | | | |
|---|---|---|---|
| 5,702,566 A | | 12/1997 | Tsui |
| 5,949,600 A * | | 9/1999 | Akiyama et al. ............... 360/55 |
| 6,482,558 B1 | | 11/2002 | Singh et al. |
| 7,068,452 B2 * | | 6/2006 | Ogawa et al. .................. 360/55 |
| 7,147,790 B2 | | 12/2006 | Wachenschwanz et al. |
| 7,212,484 B2 * | | 5/2007 | Maeda et al. ................ 369/126 |
| 7,864,473 B2 * | | 1/2011 | Ogawa et al. .................. 360/55 |
| 2003/0021967 A1 | | 1/2003 | Sagiv et al. |
| 2007/0001331 A1 | | 1/2007 | Kamata et al. |
| 2007/0023704 A1 | | 2/2007 | Nakada et al. |
| 2007/0072013 A1 | | 3/2007 | Haginoya et al. |
| 2007/0114401 A1 | | 5/2007 | King et al. |
| 2007/0125969 A1 | | 6/2007 | Schellenberg et al. |

OTHER PUBLICATIONS

"Modification of hydrogen-passivated silicon by a scanning tunneling microscope operating in the air," by Dagata et al., Appl. Phys. Lett. 56(20), May 14, 1990, pp. 2001-2003.

"Nanofabrication by scanning probe microscope lithography: A review," by Tseng et al., J. Vac. Sci. Technol. B 23(3), May/Jun. 2005, pp. 877-894, 2005 American Vacuum Society.

"Modification of tantalum surfaces by scanning tunneling microscopy in an electrochemical cell," by Thundat et al., J. Vac. Sci. Technol. A 8(4), Jul./Aug. 1990, pp. 3537-3541, 1990 American Vacuum Society.

"Tip-induced anodization of titanium surfaces by scanning tunneling microscopy: A humidity effect on nanolithography," by Sugimura, et al., Appl. Phys. Lett. 63(9),.

"25 nm chromium oxide lines by scanning tunneling lithography in air," by Song et al., J. Vac. Sci. Tech. B 12(6), Nov./Dec. 1994, pp. 3720-3724, 1994 American Vacuum Society.

(Continued)

*Primary Examiner* — Hoa T Nguyen
*Assistant Examiner* — James L Habermehl
(74) *Attorney, Agent, or Firm* — Saile Ackerman LLC; Stephen B. Ackerman (57) ABSTRACT

The preferred embodiments of the present invention are devices and processes for producing high resolution lithography or pattern formation on the nanometer scale, using a voltage-biased probe that is slider-mounted along with, or separate from but linked to, a magnetic read head within a HDD mechanism. The probe is guided and positioned over a target layer by the motion of the read head which is, itself, guided by signals from servo tracks on a magnetic layer that activate an electromechanical servomechanism within the HDD. An electric field produced by the probe is capable of modifying the surface of the target layer over which the probe flies either directly, or by current induced or thermally induced effects. Targets such as amorphous or crystalline silicon can be hydrogen passivated and the electric field will produce oxidized or anodized lines with nanometer resolution.

45 Claims, 4 Drawing Sheets

OTHER PUBLICATIONS

"Fabrication of silicon nanostructures with a scanning tunneling microscope," by Snow et al., Appl. Phys. Lett. 63(6), Aug. 9, 1993, pp. 749-751, 1993 American Inst. of Phys.

"Nanolithography of silicon: An approach for investigating tip-surface interactions during writing," by Ramsier et al., Applied Physics Letters, vol. 79, No. 17, Oct. 22, 2001, pp. 2820-2822.

"Nanometer scale lithography at high scanning speeds with the atomic force microscope using spin on glass," by Park et al., Appl. Phys. Lett. 67(16), Ocotber 16, 1995, pp. 2415-2417.

Tip-induced oxidative nano-machining of conducting diamond-like carbon (DLC), by Myhra, Appl. Phys. A 80, Materials Science & Processing, pp. 1097-1104, (2005).

"Lift-off metallization using poly(methyl methacrylate) exposed with a scanning tunneling microscope," by McCord et al., J. Vac. Sci. Technol. B 6(1), Jan./Feb. 1988, pp. 293-296, 1988 American Vacuum Society.

"Nanometer-scale lithography using the atomic force microscope," by Majumdar et al., Appl. Phys. Lett. 61(19), Nov. 9, 1992, pp. 2293-2295, 1992 American Institute of Physics.

"Local oxidation of silicon surfaces by dynamic force microscopy: Nanofabrication and water bridge formation," by Garcia et al., Applied Physics Letters, vol. 72, No. 18, May 4, 1998, pp. 2295-2297.

"Low voltage electron beam lithography in self-assembled ultrathin films with the scanning tunneling microscope,", by Marrian et al., Appl. Phys. Lett. 64(3), Jan. 17, 1994, pp. 390-392, 1994 American Institute of Physics.

* cited by examiner

NANO-LITHOGRAPHY WITH ROTATING TARGET AND SERVO-POSITIONED TIP

BACKGROUND OF THE INVENTION

1. Field of the Invention

This invention relates to lithographic processes for creating very high spatial resolution structures at the nanometer scale. In particular it relates to the use of voltage based probes that are positioned using hard disk drive technology.

2. Description of the Related Art

Nanolithography using high resolution imaging systems like the scanning probe microscope (SPM) and atomic force microscope (AFM) surged in the years between 1990 and 2001 following its application to the nano-patterning of a silicon surface in 1990 by Dagata et al. (J. A. Dagata et al., "Modification of hydrogen-passivated silicon by a scanning tunneling microscope operating in air," Appl. Phys. Lett., vol 56, pp. 2001, (1990)) This technique uses a high voltage (>1 V) biased scanning tip with a tip size of tens of nanometers and scans over a hydrogen passivated silicon surface. The silicon substrate is grounded to form a potential difference between the tip and the substrate surface over a tip-to-surface distance of several nanometers. Due to the close proximity between the STM tip and the surface, an electric field >1 V/nm is easily achieved and electron emission from the tip to the surface occurs with a current in the nA (nanoampere) scale. This electron current emitted from the tip leads to an assisted oxidation of the hydrogen-passivated silicon surface area that the tip scans across and consequently creates an oxidized line of nanometer scale on the silicon surface during the scan. By using a subsequent liquid chemical etching process, particularly for a Si (100) surface, the etching rate is different between the oxidized/anodized portion of the silicon surface and the non-modified portion. This oxidized nano-pattern can be used as a nano-lithography mask (see E. S. Snow, et al., "Fabrication of silicon nanostructures with a scanning tunneling microscope," Appl. Phys. Lett., vol. 63, pp 749, (1993)). This was the first proof of the viability of electric field assisted oxidation for nanolithography purposes. Subsequent work extended the technique to include STM, SPM and AFM in non-contact and contact modes to achieve nanolithography and nano-patterning on various metallic, semiconductor and even polymeric and organic surfaces.

Figure 1:
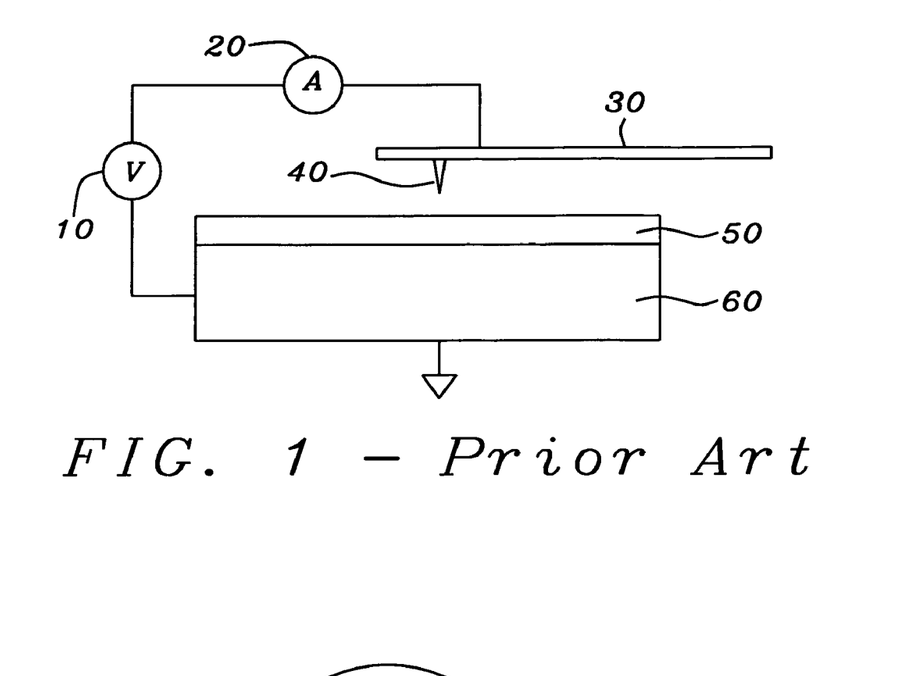
FIG. 1 is a schematic illustration of a prior art lithographic system utilizing SPM, STM or AFM technology.

Referring to FIG. 1, there is shown, schematically, a diagram of a generic, prior art voltage biased, probe-based nanolithographic system that could operate using SPM, STM, or AFM systems. In the diagram (10) is a voltage source used to bias the probe (40). An appropriate current meter (20) registers the electron flow from the probe to the target layer (50). The target layer is attached to a suitable grounded substrate (60). Although most prior work, as shown in the figure, utilized a method involving substrate grounding and probe tip electron emission, i.e., a negative voltage bias on the probe tip, positive biasing has also been tried to produce lift-off of Au—Pd nano-patterns after exposure of a thin polymethylmethacrylate (PMMA) photoresist (see, M. A. McCord and R. F. W. Pease, "Lift-off metallization using poly(methyl methacrylate) exposed with a scanning tunneling microscope," J. Vac. Sci. Technol. B, vol. 6, pp 293, (1998)). The positive bias scheme is expected to draw electrons from the substrate, producing less inelastic scattering and thereby producing sharper features in the PMMA, especially at high bias voltages.

For most of the published work a spatial resolution of the order of between 10 and 20 nm was consistently achieved. This resolution is superior to that obtained by conventional optical lithography and also superior to state-of-the-art high energy electron beam (e-beam) lithography, which produces resolutions in the order of 30 nm. In addition, as compared to advanced e-beam lithography systems which are performed under extreme vacuum and temperature conditions, this method can be performed in air without extremes in temperature and is, therefore much more economical and easier to perform. This probe-tip electron emission lithography utilizes low energy electrons during the resist exposure, which theoretically produces high spatial resolution without the backscattering that accompanies high energy electrons. In addition, the voltage biased probe assisted oxidation can be used to produce a lithography mask directly without any auxiliary photoresist processes and, similarly, can produce direct patterning of a target semiconductor or metallic film, which is surely a promising and advantageous aspect of the method.

Among the prior efforts to utilize SPM for nanolithography, there are modifications and variations that include both oxidation and photoresist exposure, material deposition and material removal. For lithography purposes, the use of photoresist is the most investigated method and two approaches have been studied. The first approach is to use the SPM tip-emitted electron current to expose thin layer photoresists, which include the popular PMMA (cited above) and other organic materials. The cited publication of McCord and, in addition, the publication of A. Majumdar et al. ("Nanometer-scale lithography using the atomic force microscope," Appl. Phys. Lett., vol 61, pp 2293 (1992)) and the work of S. W. Park et al. ("Nanometer scale lithography at high scanning speeds with the atomic force microscope using spin on glass" Appl. Phys. Lett., vol. 67, pp 2415 (1995)) show examples that can be achieved by such lithography.

In the second approach, also well documented in publications, the electric field induces localized oxidation/anodization of the path scanned by the probe tip across the target surface. The target material in this case can be crystalline or amorphous silicon and many different kinds of metals including, but not limited to Ti, Ta and Cr.

Even though the various experiments in SPM based lithography have produced results that are superior to all existing lithography techniques, the technique has not been implemented in any commercially available systems. The major reason for this lack of commercialization is the fact that the SPM, STM and AFM methodologies are intrinsically low throughput systems. To use the technique for commercially viable wafer level lithography, the positioning system has to be capable of nanometer position resolution over travel distances on the order of several inches, all the while maintaining a nanometer tip-to-target clearance (contact mode being unacceptable due to tip wearing) over the entire distance with a speed that needs to be several times faster than the reported microns per second in the SPM, STM, and AFM published results cited above. Such stringent requirements are beyond the capabilities of the reported piezo and linear stage based SPM, STM and AFM systems. Although efforts and proposals have been made to address this low throughput issue using 2-dimensional probe arrays, the complexity and cost of such a scheme make it unfavorable when compared to more straightforward methods such as high energy e-beam lithography and deep-UV photolithography.

SUMMARY OF THE INVENTION

A first object of this invention is to provide a method of utilizing probe based nanolithography, such as STM, SPM and AFM nanolithography, at a wafer level.

A second object of this invention is to provide such a nanolithographic system that provides higher spatial resolution than photolithography or e-beam lithography while also providing controllable linewidth.

A third object of this invention is to provide a method of utilizing probe based nanolithography in a manner that can provide positioning accuracy with nanometer level resolution over travel distances of several inches.

A fourth object of the present invention is to provide a method of probe based nanolithography wherein the lithography tip-to-target clearance can be consistently maintained at a few nanometers.

A fifth object of this invention is to satisfy the above objects while providing a commercially acceptable level of product throughput.

A sixth object of this invention is to satisfy the above objects while providing an economically viable methodology.

A seventh object of this invention is to provide a method that operates within normal atmospheric and temperature conditions.

An eighth object of this invention is to satisfy the above objects while providing a method that eliminates the need for high energy electron beams or UV radiation.

A ninth object of the present invention is to provide a nanolithographic method that enables rapid pattern transfer through direct surface oxidation/anodization, thereby eliminating the need for resist development.

Figure 2:
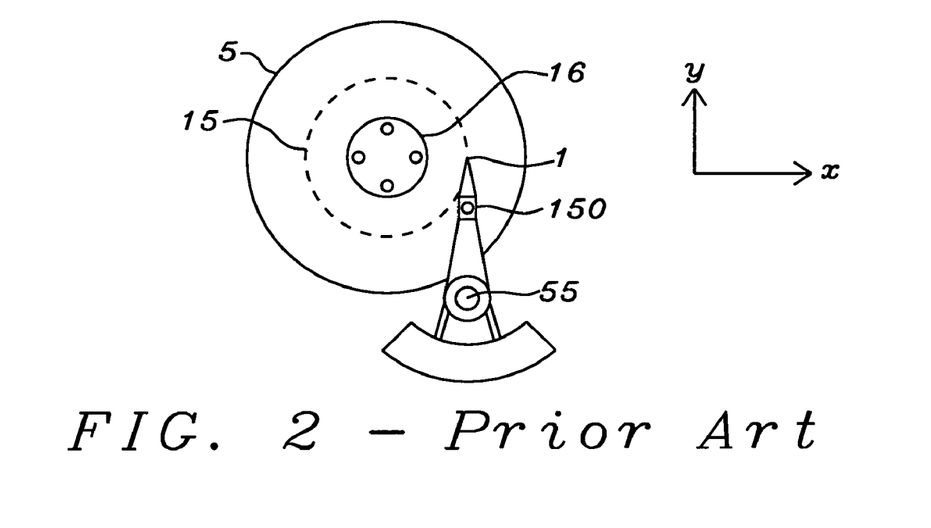
FIG. 2 is a schematic illustration of a prior art HDD.

The objects of the present invention will be achieved by a combination of voltage biased probe based nanolithography and hard disk drive servo-controlled technology. Referring to FIG. 2, there is schematically shown (in an overhead view) a portion of a prior art hard disk drive (HDD) in which a slider-mounted read/write head (1) attached to a head-gimbals assembly (HGA) (150) is positioned above a spindle (16) mounted, rotatable disk medium (5) and is capable of quickly and accurately locating positions on any one (15) of a plurality of data tracks by means of an electromechanical servo mechanism that includes a voice coil motor (55) for quickly and accurately positioning the slider. Each data track is evenly divided into sectors (not shown) that contain a fixed servo pattern for locating the track position and an adjacent data storage portion on which data can be written, stored and retrieved. The servo pattern provides both the timing and position information for the head to remain on-track as well as to read/write at correct positions along the track. In the present HDD, a three inch diameter disk can rotate with an angular velocity of up to 15,000 rpm during operation, while the slider is aerodynamically in flight over the disk surface at a "fly height" of a few nanometers. Meanwhile, with the track-to-track distance (pitch) in the radial direction approaching 100 nm, the state-of-the-art servo mechanism can position the magnetic head over a given data track with an off-track position jitter less than 5% of the track pitch. This degree of jitter translates into a radial position accuracy of less than 5 nm. In fact if the servo pattern and servo mechanism electronics were specially designed, the accuracy can be extended to +/−1 nm in the cross-track (radial) direction (signified by the x-axis here). This accuracy, moreover, can be maintained while the head scans over the entire disk surface and seeks and finds a specific track location within a time frame of only several milliseconds.

In addition to the positional speed and accuracy of the modern HDD, the drive also incorporates a fly height control mechanism that utilizes resistive heating to induce local protrusion of the slider air bearing surface (ABS) within a small area (several microns$^2$) surrounding the read/write head surface so that the recording and signal retrieval processes can be achieved at a head-to-disk distance of only several nanometers. Such thermally induced protrusion can achieve sub-nanometer accuracy and can achieve as close as 1 nm spacing between the head and the medium surface during read/write processes.

In the down-track direction (i.e., angular displacement at a fixed radius), with specially designed servo patterns, high bandwidth electronics and stable spindle mechanics (insignificant wobble, etc.) the time resolution and repeatability of the read-back and recording processes can reach to less than 5 nm physical accuracy, meaning that the write and read processes can be repeated at the same position on the disk with less than 5 nm position error in the down-track (y-axis) direction. Considering the x-axis direction accuracy as also less than 5 nm, the total position accuracy of the head on the medium already reaches the level of resolution in most SPM and AFM systems; however, with a much larger reachable area and a scan speed many-fold faster.

Given that the voltage biased probe nanolithography is very well studied and reported on in the prior art cited above and given, further, the state-of-the-art positioning capabilities of HDD technology, such a voltage biased probe provided with an associated read head and controlled by a position locating servomechanism and positioned over a rotatable target substrate, will meet the objects of the invention as set forth above. The resulting entirely new type of ultra-high resolution lithography will provide an unprecedented ability to produce nano-features on an area whose size is on the scale of a silicon wafer. The technical practicality of the method is guaranteed by the maturity of HDD manufacturing techniques, known photoresist and thin film coating techniques as well as existing servo techniques. In addition, the method will be implemented within normal in-air conditions and temperatures and uses no expensive and complex tooling to generate high vacuum conditions or produce high energy e-beams. Thus, it is economically viable.

BRIEF DESCRIPTION OF THE DRAWINGS

The objects, features, and advantages of the present invention are understood within the context of the Description of the Preferred Embodiment as set forth below. The Description of the Preferred Embodiment is understood within the context of the accompanying figures, wherein.

DESCRIPTION OF THE PREFERRED EMBODIMENTS

The preferred embodiments of the present invention are devices and processes for producing high resolution lithography or pattern transfer on the nanometer scale, using a voltage biased probe that is slider-mounted within a HDD mechanism. The probe is guided and positioned by the HDD electromechanical servomechanism over a rotating disk that includes pre-written servo data and acts as a target or supports a target for the resulting lithographic process. Although there will be three preferred embodiments of the invention, they all share a basic structure which will be described first in the following.

(a) General Structure of a Servo Positioned Lithography Tool

The invention uses HDD technology, which is able to fly a slider-mounted magnetic read head (more generally a read/write head) over the surface of a rapidly rotating disk while maintaining a controlled head-to-disk spacing. In this mode, the HDD is capable of positioning the head over a given track (out of a plurality of tracks) by means of an electromechanical servo mechanism that, using the reading ability of the read head, locates a track and maintains the head in a proper position relative to that track so that accurate reading and writing operations can occur. By adding an appropriate nano-lithographic probe to the slider, along with the guiding read head, the probe will acquire the same ability as the read head, namely the ability to be quickly, accurately and repeatedly positioned over the surface of a rotating target so that it may engage in lithographic processes while achieving high throughput and low-cost high-resolution nanolithography over a large surface area. The following is a list of structures and properties that the system will be endowed with so that it will meet the objects of the invention.

(1) A probe structure embedded in a slider that can fly over a spinning surface.
(2) A magnetic sensor (read head) embedded in a slider that enables it to be guided to specific positions as it flies over a spinning surface. The probe and read head can reside in the same slider or in different sliders.
(3) A disk type of medium that includes the target surface over which the probe-bearing slider can fly.
(4) A disk type of medium with a surface that contains pre-written magnetic servo patterns to provide positional guidance for the probe. This surface can be the same surface as the target surface, it can be a surface on the side opposite the side of the disk on which the target resides or it can be a surface on an entirely different disk.
(5) The disk media having target and servo surfaces spin on one spindle.
(6) The probe slider and the sensor slider, if not the same slider, are mechanically linked so that the movement of one slider produces an identical movement of the other.
(7) The servo information retrieved by the magnetic read sensor is used to position the sliders over the disk medium.
(8) A voltage bias is applied between the probe and the target surface to produce a high tip-to-surface electric field or electron emission current that will physically or chemically modify the target surface directly below the probe.

(b) Considerations Pertinent to the Lithography Process

As already shown, a lithography target can be crystalline or amorphous silicon with a hydrogen-passivated surface. It can also be any of various types of metal (e.g. Ti, Ta, Cr) and different types of photoresist. To initiate the lithographic process the target surface must be a conductive material or be in contact with a conductive substrate so that a voltage bias can be applied between the probe tip and the target surface. Since the lithography method depends on the locally high electric field produced by the probe tip, the distance between the tip and the target surface is, in theory, a sensitive factor in its performance.

In a HDD there is always a thin layer of lubricant on the disk surface that assists the aerodynamic performance of the slider as it flies over the disk surface at a height of just several nanometers. For general lithography purposes, this lubricant layer may not necessarily be required, but rather a direct coating of the target photoresistive layer or the lithographic target layer itself may be sufficient. The possibility of utilizing such a lubricant-free scheme is due to the following. First, the slider will not need to retain its ability to fly over the disk for the same number of years as it would in the operation of a HDD. The slider need only be reliable during the actual lithographic process, which takes, at most, hours or less. Thus, without the assistance of a lubricant, the probability of a slider "crash" on the disk surface is minimal. In addition, given that the cost of a new slider is relatively low, the slider can be considered as a dispensable part of the apparatus and it can be replaced after each lithographic task. In addition, although some of the target films, for example PMMA photoresist, will increase the probe tip-to-conducting surface distance, it has been shown by S. W. Park et al. (cited above) that lithography can be achieved even with through a non-conducting film thickness of 100 nm, indicating that a higher slider fly height (>10 nm) and larger spacing between the tip and the conducting surface will not prevent the lithography from occurring. Considering, also, that conductive photoresists can be used to enhance the electric field from the probe tip (see, e.g., Singh et al., U.S. Pat. No. 6,482,558 B2), a photoresist based form of nanolithography is clearly a possibility.

This servo-positioned lithography method can be generally applied to silicon based wafers, either by coating them with photoresist or by directly oxidizing/anodizing their surfaces, as long as the wafer can be made to spin as a disk on a spindle and a slider can be made to fly over the surface. However, a particularly and immediately suitable area for application of the method is its utilization in the HDD technology itself, in the fabrication of the patterned track and patterned bit structure of the disk medium. A HDD medium usually has a thin protective layer of diamond-like-carbon (DLC) deposited directly on top of the magnetic recording layer. Another thinner polymeric lubricant layer (a few nm thick) is bound onto the DLC surface to assist the slider in flying. The actual spacing between the pole tip and the conducting metallic recording layer and layers beneath that layer can be made to be less than or equal to 10 nm. Prior studies show that oxidation of both DLC (see S. Mythra, "Tip-induced oxidative nano-machining of conducting diamond-like carbon (DLC)" Appl. Phys. A, vol. 80, pp 1097-1104 (2005)) and metallic materials by using SPM based lithography methods (see H. Sugumura et al. "Tip-induced anodization of titanium surfaces by scanning tunneling microscopy: A humidity effect on nanolithography," Appl. Phys. Lett, vol. 63, pp 1288 (1993); T. Thundat et al., "Modification of tantalum surfaces by scanning tunneling microsopy in an electrochemical cell," J. Vac. Sci. Technol. A, vol. 8, pp 3537 (1990); H. J. Song et al., "25 nm chromium oxide lines by scanning tunneling lithography in air," J. Vac. Sci. Technol. B, vol. 12, pp 3720 (1994)). Thus it is proposed in this invention that patterned track or patterned bit magnetic media can be created with the servo positioned direct oxidation method as stated above, where the patterned magnetic features are separated by metallic oxides instead of a physical gap as shown in prior arts (see Wachenschwantz, U.S. Pat. No. 7,147,790 B2; Y. Kamata et al. US Publ. Pat. Appl. 2007/0001331; K. Nakada et al., US Pub. Pat. Appl. 2007/0023704 A1; C. Haginoya et al., US Pub. Pat. Appl. 2007/0072013 A1). Compared with prior art that requires e-beam patterning, stamping and refill of the track gap and subsequent polishing, this direct oxidation patterning utilizes existing and mature HDD features, is realizable in air, produces less surface roughness and has much better controllability than e-beam and stamping. This new track and bit patterning method is also much simpler and cost effective as it is based on well studied physical processes and mature positioning techniques.

(c) Considerations Pertinent to the Servo Pattern, Lithography and Fly Height Control With the existing servo pattern and servo following techniques of today's HDD, the cross-track accuracy is already achieving resolution that is <5 nm. However, the down-track spatial resolution depends on the time resolution of the servo system, whereas the time resolution degrades as the slider flies past the servo pattern and moves farther away. However, in the proposed servo-positioned lithography system given herein, it is not necessary that data be stored in the sectors between successive servo sectors. Therefore, a much greater number of servo patterns can be written in a given track producing a much denser servo pattern arrangement along the track. Thus time resolution can be significantly enhanced and, as a result, spatial resolution along the track can be enhanced as well.

For a high throughput of the servo-positioned lithography, a plurality of disk-type lithography targets (e.g., target layers mounted on a disk) can be arranged into a single stack on the same spindle. In addition, as discussed below, a plurality of fixed-position probe tips can be imbedded in each slider to provide multi-track patterning. Within the stack, a magnetic disk with prepared servo patterns is used as the servo disk. The sliders with the embedded lithography probes are also positioned in a rigidly (in the horizontal direction) connected stack together with a slider that has a magnetic read head. Each probe-containing slider is positioned over a corresponding target disk. The slider-mounted read head flies over the servo disk and positions the linked set of slider-mounted probes (or probe arrays) over their corresponding target disks. Thus, servo positioned lithography can be simultaneously carried out on a plurality of separate target disks or in multiple tracks on a single target disk. In this way, throughput of the lithography system can be increased in proportion to the number of target disks in the stack, each of which is processed by an exposure/oxidation method in parallel with the others.

The fly height of the probe tip relative to the target surface can be fed back in different ways. For the case where a magnetic recording layer is the target film or where such a layer exists beneath the target film, magnetic servo patterns can be pre-recorded into the magnetic layer and a magnetic sensor embedded in the same slider as the probe can be used to feed back the fly height from the read-back waveform of the servo pattern. For the case where only a conductive layer exists on the target surface, the electric current of the emitted electrons from the probe can be used to feed back the information about the fly height, based on the fact that a lower fly height will theoretically produce a higher emission current for the same voltage bias.

With fly height feedback, a resistive heater can produce fly height control of the probe tip by producing local protrusion of the probe tip region of the slider towards the target surface. The fly height can also be controlled by varying the bias voltage of the pole tip, where a higher bias will produce a lower clearance between the pole tip and the surface due to minimization of capacitative energy between pole tip and surface. However, the thermal protrusion control is regarded as being more efficient in controlling fly height. The two methods can also be used together to reach an optimum lithography resolution.

(d) Probe Making Based on Magnetic Head Manufacture Processes

Conventional SPM, AFM and STM probe making is regarded as being unsuitable for the proposed servo positioned lithography method. A first reason for this lack of suitability is that the slider fabrication involves a process of "lapping" the disk-facing surface of the slider, i.e. micromachining this surface, which is commonly called the air-bearing surface (ABS). When doing this lapping, stopping the lapping process at the emerging stand-alone probe tip without causing any physical damage is physically unrealistic. The second and more important reason is that the stand-alone tip is prone to smearing, especially when the tip is flying over a spinning surface that has an under-probe linear speed of several hundreds to several thousands inches of distance in one second. Therefore it is imperative to have a probe making process that is friendly to the lapping of the slider. The body of the probe must also be embedded into non-conductive material for protection against smearing, in a manner similar to the protective coating that covers the read/write head in today's magnetic heads. In short, compared to probe tips used in microscopy (as in FIG. 1) where the target is stationary, the present probe tip is exceedingly close to a rapidly moving target and must be protected from accidental contacts with it.

Figure 3A:
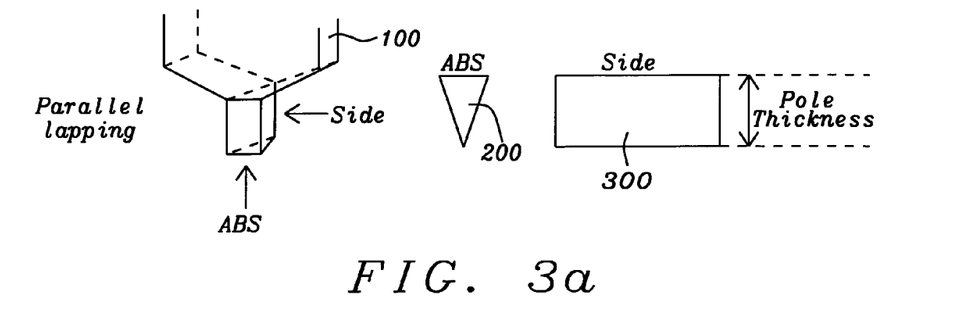
FIG. 3a and FIG. 3b are schematic illustration showing methods of forming a probe tip using write-head fabrication processes.
Figure 3B:
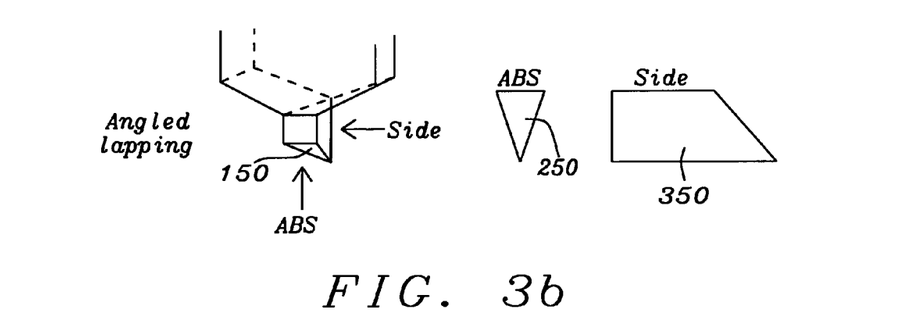

FIG. 3a and FIG. 3b each show a possible probe making process based on state of the art write-head magnetic pole manufacturing processes. FIG. 3a shows, side by side, a 3D schematic illustration of a magnetic pole tip (100), an ABS view (200) of the pole tip as seen by looking up at the ABS plane of the slider and a side view (300) of the pole tip, all seen after a lapping process parallel to the ABS plane. The basic solid triangular shape in (100), leading to the triangular ABS plane cross-section (200), is produced by any of various shaping mechanisms, such as ion-beam milling. During the normal lapping procedure the lapping plane is parallel to the ABS of the slider. Thus the resulting solid triangular pole shape (100) where it emerges on the ABS plane (200) is also a triangle. However, as illustrated schematically in FIG. 3b, if the slider is slightly tipped relative to the lapping surface by a certain angle towards the trailing edge of the slider, which is the top edge of the triangle, the resulting shape (150) of the same pole that is denoted (100) in FIG. 3a, is now tapered towards the ABS where it emerges at the slider surface (250) and, as seen from the side, forms a sharp tip at the lowest ABS point (350). This angled lapping process will produce the same quality pole tip independent of the lapping depth into the pole. A small pole tip can also be achieved if the original pole tip ((100) in FIG. 3a) thickness is, for example, less than approximately 30 nm at the ABS, in which case even parallel lapping (as in FIG. 3a) would produce an acceptable pole tip. These pole tips can also be used as lithography probes that will achieve the objects of this invention.

Figure 4A:
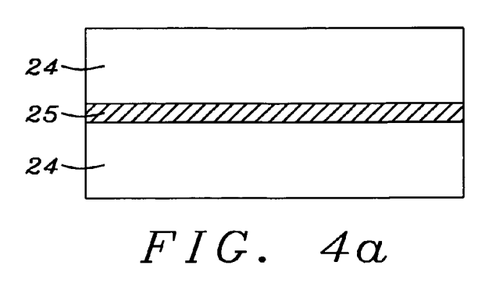
FIG. 4a and FIG. 4b are schematic illustrations of a method of forming a probe tip.
Figure 4B:
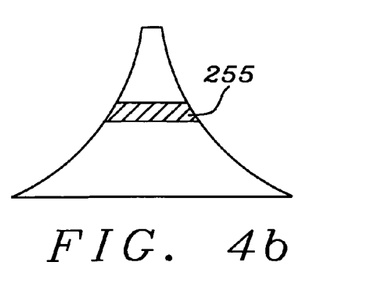

Referring to FIG. 4a and FIG. 4b, there is shown schematically an alternative process for forming a probe tip. In FIG. 4a there is shown a three layer laminated structure in which a thin layer of conducting material (25) is sandwiched between two non-conducting layers (24). The central conducting layer can be a layer of Au, Cu, W, etc., formed to a thickness between several Angstroms to tens or hundreds of nanometers. Referring to FIG. 4b, there is shown the laminate of FIG. 4a subsequent to a side trimming process, such as ion-beam milling, that leaves a small segment (255) of the conductive layer of width preferably equal to or less than approximately 30 nm. This trimming process is commonly used in both write head and read head fabrication.

First Embodiment

Figure 5A:
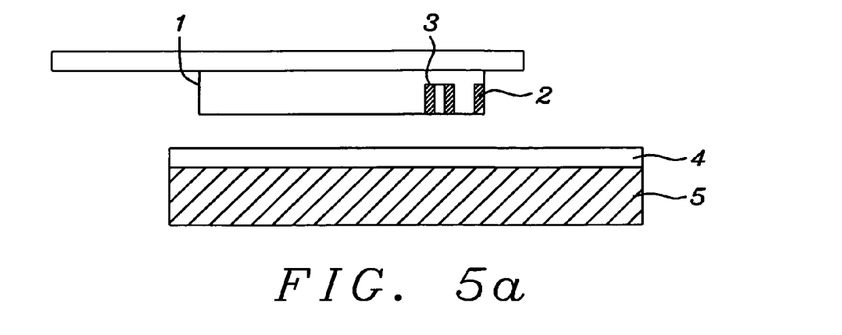
FIG. 5a is a schematic illustration of a first embodiment of the invention in which a probe tip is embedded in a slider in which there is a read-head and the slider is positioned above a target disk.

Referring to FIG. 5a there is shown a schematic illustration of a first embodiment of the present invention wherein a single slider (1) in which are embedded a probe (2) and a read head (3) flies above a rotating target layer or film (4) that is formed on a supporting electrically conducting substrate (5). The probe (2) tip is tapered (as shown in FIG. 3b) to form a sharp point. A voltage difference between the probe tip and the substrate (5) (or the film itself if the film is conducting) produces an electric field (not shown) between the probe (2) tip and the film. The strength of the field produces a physical or chemical modification of the film surface directly below the probe tip either by means of assisted oxidation/anodization of the chemical structure of the film or by electron emission from the probe to the film that breaks chemical bonds within the film or through thermal heating of the film itself.

Either the substrate (5) or the film (4) contain pre-written servo patterns that guide the read element (3) to target locations within the film (4). Typically the substrate will be a disk and will contain pre-written servo data. The target layer (4) can be a semiconductor material, a metal, an organic composition or a polymeric composition and it can be pre-treated, chemically treated or otherwise, to enhance the lithographic process. The distance between the probe tip (2) and the target layer (4) is the fly height of the slider and this height can be controlled by means of a resistive heater (not shown) embedded within the slider near the read head or probe. Temperature changes in the slider produced by the heater will cause the ABS of the slider to protrude, bringing the probe tip and read head closer to the target layer. The position of the heater is such as to produce optimal amounts of protrusion for sensitive control of fly height. Alternatively, the height can be controlled by varying the voltage amplitude between the probe tip and the conducting substrate (5) and using feedback from the current generated. After the target layer or film has been patterned by the process, it can be removed from the substrate and used as a mask or stencil in subsequent fabrication processes. Thus, if the target is a film or layer of photoresist, the resultant patterned layer can be used in photolithographic processes. Similarly, if the target is an e-beam resistant layer or an ion beam resistant layer, the subsequent patterned target can be used as a stencil in e-beam or ion-beam processes. In addition, after patterning the target and removing necessary material from the exposed/unexposed area, the target can be used as a hard mask/stencil in pattern transfer through a stamping process. If the target film is a magnetic recording medium, the resulting patterned medium can serve as a magnetic patterned medium with or without further processing.

Figure 5B:
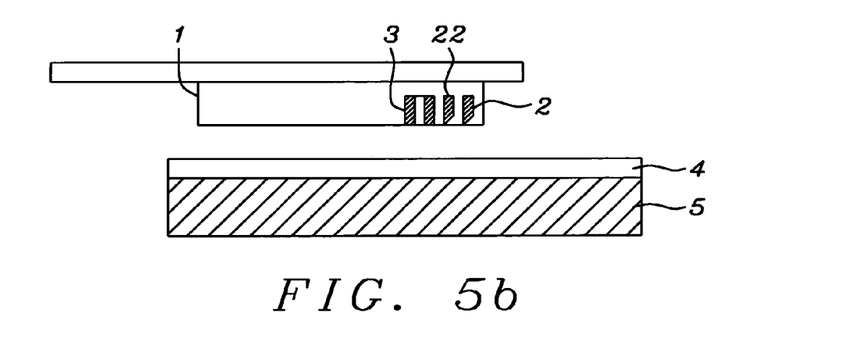
FIG. 5b is a schematic illustration of a device that is substantially identical to that in FIG. 5a except that two probes are shown to be embedded in the slider.

Referring to FIG. 5b, there is shown schematically a device in all respects identical to the device of FIG. 5a except that two probe tips, (2) and (22) are shown mounted within the slider (1). In fact, although only two tips are shown for clarity, the nature and operation of the device allows for the embedding of a plurality of probe tips, in arbitrary arrays within the slider, so that multiple copies of a pattern may be transferred to a target disk medium. It is understood that the probe tips will be mounted with a pre-determined spacing and pattern, in fixed positions relative to each other. By a process of multiple-track patterning, such an arrangement could increase the throughput of the pattern transfer process.

Second Embodiment

Figure 6:
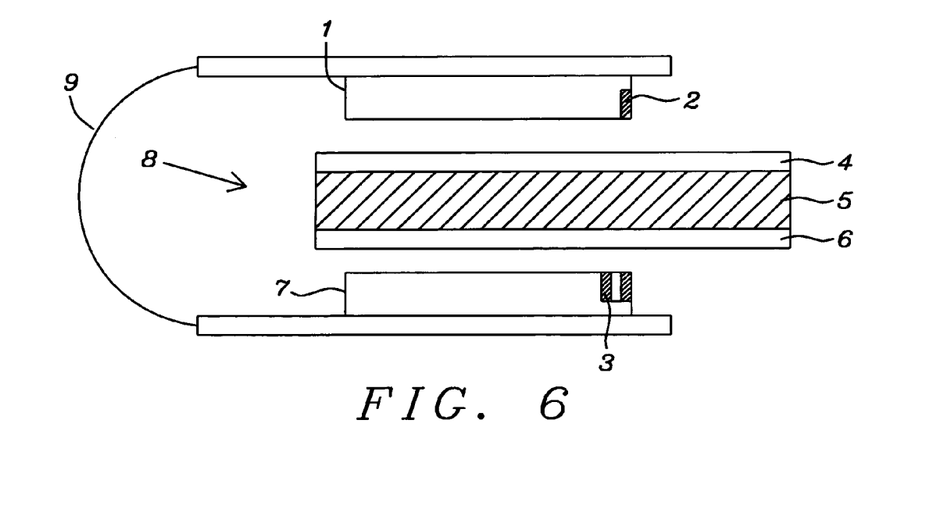
FIG. 6 is a schematic illustration showing a second embodiment of the present invention in which separate sliders are positioned adjacent to opposite surfaces of a target disk, wherein one slider contains a probe tip and the other slider contains a read-head.

Referring to schematic FIG. 6 there is shown a configuration that includes two linked (9) sliders, (1) and (7), and a rotating disk (8) between them. The sliders are electromechanically linked (9) so that they move substantially in unison, subject to the description below. The disk, in this embodiment, is a three-layered laminate formed as a central conducting layer (5) sandwiched between (and acting as a substrate for) an upper target layer (4) and a dedicated magnetic layer (6) that contains pre-written servo data. The lower slider (7) contains an embedded read head (3) that reads the servo data in layer (6) and, by its motion, guides the probe tip (2) in linked slider (1). Note that the two sliders must be rigidly linked (9) with respect to horizontal motion (in the disk plane) so that the motion of slider (7) produces a corresponding motion of slider (1) and so that the probe tip is positioned opposite a unique position corresponding to each position located by the read head. The linkage is typically mechanical, through interconnections between the actuators (not shown) on which the sliders are mounted. It is also possible that the sliders could be linked electromechanically. Note also that the linkage will generally permit minor variations in the vertical (perpendicular to the disk plane) separation of the sliders since motion of the disk will induce aerodynamic changes in the fly heights of each of the sliders relative to the disk surfaces they face. The relative horizontal (parallel to the disk plane) separation of the sliders, however, must either (preferably) remain fixed or else change in a linear manner, so that the positions located on servo tracks by the read head can be accurately transferred to the probe tip for patterning the target and so that changes in the horizontal position of the read head will be accompanied by corresponding and unique changes in the horizontal position of the probe tip.

Third Embodiment

Figure 7:
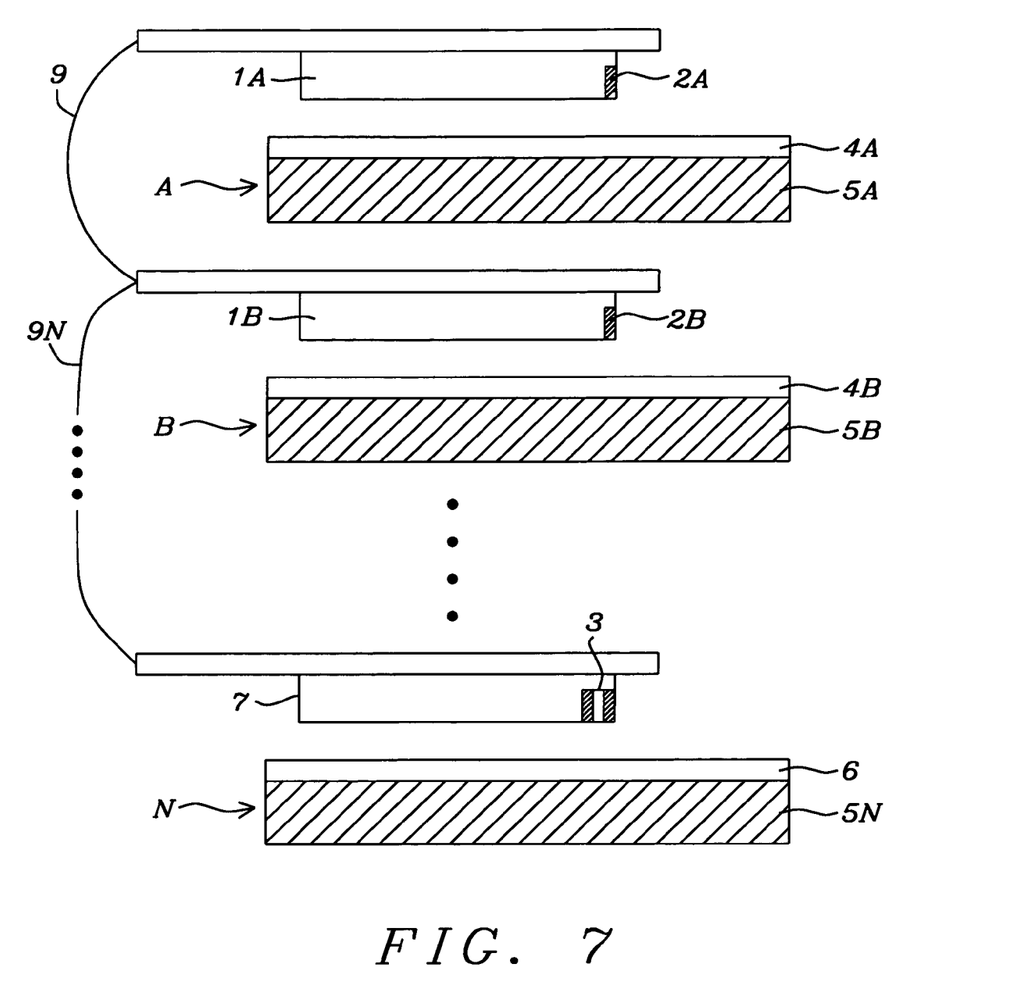
FIG. 7 is a schematic illustration of a third embodiment of the present invention in which multiple target disks are put into a stack configuration and a separate probe tip accesses each target disk. A servo-disk and a servo slider with an embedded read-head is used to position all the probe tips at the same time.

Referring to schematic FIG. 7 there is shown a third embodiment in which a plurality of disks, (only disks labeled A and B are shown, but the possibility of additional disks is understood and indicated as a sequence of vertical dots), is formed as a stack that is mounted co-axially on a single spindle (spindle not shown). The disks spin as a single unit with no angular motion of one disk relative to any other. Each disk includes a target film, (films labeled 4A and 4B are shown, but the possible additional disks would have substantially identical films) and a conducting substrate on which the film is formed, (the substrates being labeled 5A and 5B, but additional disks would have substantially identical substrates). The film and substrate move as a unit. A single additional disk, denoted N, is the last disk in the stack and it is also fixed in its motion relative to the other disks. This Nth disk includes a dedicated magnetic film (6) with pre-written servo data, instead of the target films 4A and 4B of disks A, B respectively and the possible other films of other disks not shown. The magnetic film (6) of the Nth disk is mounted on a conducting substrate (5N).

A separate set of sliders is labeled, corresponding to the disks, as 1A, and 1B, with additional sliders assigned to the possible additional disks. Each slider accesses its respective disk. Each slider contains an embedded probe, 2A and 2B, with additional sliders having corresponding probes. The sliders are all rigidly linked to each other so that they move as a unit in the horizontal planes of the disks. A schematic linkage (9) is shown between sliders 1A and 1B, A slider (7) that accesses disk N contains an embedded read head (3) that reads the pre-written servo-data on the magnetic film (6). This slider (7) is rigidly linked (9N) to all the other sliders and thereby guides the simultaneous positioning of all the other sliders.

As is finally understood by a person skilled in the art, the preferred embodiments of the present invention are illustrative of the present invention rather than limiting of the present invention. Revisions and modifications may be made to methods, materials, structures and dimensions employed in forming, providing and using an system for voltage biased probe tip nanolithography guided by HDD servo technology, while still forming, providing and using such a system in accord with the spirit and scope of the present invention as defined by the appended claims.

What is claimed is:

1. A method for lithography or pattern formation on the nanometer scale comprising:

providing an HDD that includes at least one rotatable, spindle-mounted, electrically conductive disk having an upper and a lower surface, a magnetic layer having servo data pre-written in servo tracks thereon fixedly mounted on the upper or lower surface of said at least one disk, a slider-mounted magnetic read head capable of moving relative to said at least one disk and facing said magnetic layer, an electromechanical servomechanism for guiding said slider-mounted read head to a selected servo track position on said magnetic layer, at least one slider-mounted voltage-biased probe capable of moving simultaneously with said magnetic read head while retaining a fixed or linearly varying horizontal position relative thereto, and circuitry for creating an electric field between said at least one probe and said at least one disk by means of said voltage bias, whereby a portion of a target layer can be chemically or physically modified; then mounting said target layer on which a pattern is to be formed on said upper surface or said lower surface of said at least one disk, said target layer facing said at least one slider-mounted voltage-biased probe; then rotating said at least one disk, thereby aerodynamically raising said slider-mounted read head and said at least one slider mounted voltage-biased probe to a flying height; then using said servomechanism and said servo tracks, successively positioning said slider-mounted read head over a set of points on said magnetic layer forming a pattern to be transferred to said target layer, thereby successively positioning said at least one slider-mounted probe over a corresponding pattern of points on a surface of said target layer; and creating a potential difference and a resulting electric field between said at least one slider-mounted probe and said target layer at each of said pattern of points by means of said voltage bias; thereby chemically or physically modifying said target layer at each of said pattern of points and, thereby, transferring said pattern to said target layer.

2. The method of claim 1 wherein said slider-mounted read head and said at least one slider-mounted probe includes an embedded heating element located adjacent to said read head and an embedded heating element adjacent to said probe, whereby a thermal protrusion of said read head and said probe can be produced thereby providing a control of read head and probe fly height during device operation.

3. The method of claim 1 wherein there is only one disk and wherein said slider-mounted read head and said slider-mounted voltage-biased probe are mounted within the same slider and wherein said target layer and said magnetic layer are mounted on said disk surface facing said slider.

4. The method of claim 3 wherein said fly height is adjusted using feedback from said slider-mounted read head to maintain a precise distance above said target and to produce, thereby, a precise spacing between said probe and said target surface.

5. The method of claim 1 wherein there is a single disk on which said magnetic layer and said target layer are mounted on opposite sides and wherein said slider-mounted read head and said slider-mounted voltage-biased probe are mounted in different sliders, wherein said slider-mounted read head faces said magnetic layer and wherein said slider-mounted voltage-biased probe faces said target layer and wherein said sliders are mechanically or electromechanically linked together mechanically or electromechanically.

6. The method of claim 1 wherein said HDD includes a plurality of conducting disks, coaxially mounted on said spindle and capable of rotating with fixed relative positions to each other and wherein one disk of said plurality has said magnetic layer mounted thereon and has said slider-mounted read head positioned adjacent to and facing said magnetic layer and wherein the remainder of said plurality of disks each have a target layer mounted thereon and wherein a separate slider-mounted voltage-biased probe is positioned adjacent to and facing each of said target layers, and wherein each slider mounted voltage-biased probe is mechanically or electromechanically linked to said slider-mounted read head and to all other slider mounted probes, whereby the motion of said slider-mounted read head relative to said magnetic layer creates a simultaneous corresponding motion of each said slider-mounted probe while retaining a fixed or linearly varying horizontal position relative thereto.

7. The method of claim 1 wherein said probe within said at least one slider-mounted probe is a patterned array comprising a plurality of probe tips, whereby said probe creates multiple copies of said pattern.

8. The method of claim 1 wherein said chemical modification is produced by direct action of said electric field, or by an electron current between said probe and said target or by current-induced heating of said target.

9. The method of claim 1 wherein said target is a hydrogen-passivated amorphous or crystalline silicon surface and said chemical modification is by a process of oxidation or anodization.

10. The method of claim 1 wherein said target is a metallic layer and said chemical modification is oxidation induced by said electric field.

11. The method of claim 1 wherein said fly height is determined by the aerodynamics between said slider-mounted read head, said at-least one slider-mounted voltage-biased probe and adjacent surfaces of said rotating at-least one disk.

12. The method of claim 1 wherein said fly height is adjusted to maintain a precise distance above said target and to produce, thereby, a precise spacing between said probe and said target surface.

13. The method of claim 12 wherein said fly height is adjusted by heater induced protrusion of said slider ABS or by changing the voltage between the probe and the target.

14. The method of claim 1 wherein said target layer is a non-metallic, non-organic and non-polymeric layer that can be modified chemically or physically by said electric field or its effects.

15. The method of claim 1 wherein said target layer is a layer of diamond-like carbon.

16. The method of claim 1 wherein said target layer is a layer of organic or polymeric material.

17. The method of claim 1 wherein said target layer is PMMA photoresist that changes its properties upon passage of a current through it.

18. The method of claim 1 wherein said target layer is a multilayered lamination comprising both metallic and non-metallic layers.

19. The method of claim 1 wherein said patterned target layer is used as a mask for subsequent device processing.

20. The method of claim 1 wherein said patterned target layer is a layer of PMMA photoresist and a resulting pattern formed therein allows said layer to be used in photo-lithography.

21. The method of claim 1 wherein the target layer is a layer of e-beam resistive material and the resulting pattern formation allows it to be used as a pattern stencil for e-beam patterning.

22. The method of claim 1 wherein the target layer is used as a pattern stencil for transferring a pattern by a stamping process.

23. A device for lithography or pattern formation on the nanometer scale comprising:
an HDD that includes
at least one rotatable, spindle-mounted, electrically conductive disk having an upper and a lower surface,
a magnetic layer having servo data pre-written in servo tracks thereon fixedly mounted on the upper or lower surface of said at least one disk,
a slider-mounted magnetic read head capable of moving relative to said at least one disk and facing said magnetic layer,
an electromechanical servomechanism for guiding said slider-mounted read head to a selected servo track position on said magnetic layer,
at least one slider-mounted voltage-biased probe capable of moving simultaneously with said magnetic read head while retaining a fixed or linearly varying horizontal position relative thereto, and
a target layer fixedly mounted on the upper or lower surface of said at least one disk, said target layer facing said at least one slider-mounted voltage-biased probe, and
circuitry for creating an electric field between said at least one probe and said at least one disk by means of said voltage bias, whereby a portion of said target layer can be chemically or physically modified; and
whereby, as said slider-mounted read head is positioned opposite a selected servo track position, said at least one slider-mounted probe is correspondingly positioned opposite a uniquely corresponding point on said at target layer and said electric field can produce said modification thereat.

24. The device of claim 23 wherein said slider-mounted read head and said at least one slider-mounted probe includes an embedded heating element located adjacent to said read head and an embedded heating element adjacent to said probe, whereby a thermal protrusion of said read head and said probe can be produced thereby providing a control of a slider-mounted read head fly height and a slider-mounted voltage-biased probe fly height during device operation.

25. The device of claim 23 wherein there is only one disk and wherein said slider-mounted read head and said slider-mounted voltage-biased probe are mounted within the same slider and wherein said target layer and said magnetic layer are mounted on said disk surface facing said slider.

26. The device of claim 25 wherein the physical distance between said voltage-biased probe and said target layer surface can be obtained by feed back from the read head signal.

27. The device of claim 23 wherein there is a single disk on which said magnetic layer and said target layer are mounted on opposite sides and wherein said slider-mounted read head and said slider-mounted voltage-biased probe are mounted in different sliders, wherein said slider-mounted read head faces said magnetic layer and wherein said slider-mounted voltage-biased probe faces said target layer and wherein said sliders are mechanically or electromechanically linked together mechanically or electromechanically.

28. The device of claim 23 wherein said HDD includes a plurality of conducting disks, coaxially mounted on said spindle and capable of rotating with fixed relative positions to each other and wherein one disk of said plurality has said magnetic layer mounted thereon and has said slider-mounted read head positioned adjacent to and facing said magnetic layer and wherein the remainder of said plurality of disks each have a target layer mounted thereon and wherein a separate slider-mounted voltage-biased probe is positioned adjacent to and facing each of said target layers, and wherein each slider mounted voltage-biased probe is mechanically or electromechanically linked to said slider-mounted read head and to all other slider mounted probes, whereby the motion of said slider-mounted read head relative to said magnetic layer creates a simultaneous corresponding motion of each said slider-mounted probe while retaining a fixed or linearly varying horizontal position relative thereto.

29. The device of claim 23 wherein said at least one slider-mounted voltage-biased probe is shaped by a lapping process applied to an ABS of said slider.

30. The device of claim 23 wherein said slider-mounted probe is formed as a patterned array of probe tips with fixed distances therebetween.

31. The device of claim 23 wherein said probe is positioned successively at a plurality of points, whereby said probe creates an electric field at each of said points chemically altering the target surface at said points and said probe creates, thereby a pattern.

32. The device of claim 23 wherein said physical or chemical modification of said target layer is produced by direct action of said electric field, or by an electron current between said probe and said target or by current-induced heating of said target.

33. The device of claim 23 wherein said target is a hydrogen-passivated amorphous or crystalline silicon surface and said chemical modification is by a process of oxidation or anodization.

34. The device of claim 23 wherein said target is a metallic layer and said chemical modification is oxidation induced by said electric field.

35. The device of claim 23 wherein the fly height is adjusted to maintain a precise distance above said target and to produce, thereby, a precise spacing between said probe and said target surface.

36. The device of claim 23 wherein said flying height is adjusted by heater induced protrusion of said slider ABS or by the maintenance of a fixed current between the probe and the target.

37. The device of claim 23 wherein said target layer is a non-metallic, non-organic and non-polymeric layer that can be modified chemically or physically by said electric field or its effects.

38. The device of claim 23 wherein said target layer is a layer of diamond-like carbon.

39. The device of claim 23 wherein said target layer is a layer of organic or polymeric material.

40. The device of claim 23 wherein said target layer is PMMA photoresist that changes its properties upon passage of a current through it.

41. The device of claim 23 wherein said patterned target layer is used as a mask for subsequent device processing.

42. The device of claim 23 wherein said patterned target layer is a layer of photoresist and a resulting pattern formed therein allows said layer to be used in photo-lithography.

43. The device of claim 23 wherein the target layer is a layer of e-beam resistive material and the resulting pattern formation allows it to be used as a pattern stencil for e-beam patterning.

44. The device of claim 23 wherein said probe tip is formed by deposition of a metallic layer and shaped by a process of ion-beam milling and mechanical lapping to produce a sharp point.

45. The device of claim 23 whereby said pole tip is formed by a deposition on said slider of a triple laminate wherein a conducting layer is sandwiched between two non-conducting layers and wherein said laminate is then shaped to produce a conducting pole tip.

* * * * *